(12) United States Patent
Yamawaki et al.

(10) Patent No.: US 8,499,660 B2
(45) Date of Patent: Aug. 6, 2013

(54) HOLLOW RACK AND HOLLOW RACK MANUFACTURING METHOD

(75) Inventors: Takashi Yamawaki, Komaki (JP); Ryosuke Suzuki, Kani (JP); Tetsuji Murata, Nagoya (JP); Tsuyoshi Yamamoto, Nagoya (JP); Yutaka Kiyosawa, Kariya (JP)

(73) Assignee: Neturen Co., Ltd., Tokyo (JP)

( * ) Notice: Subject to any disclaimer, the term of this patent is extended or adjusted under 35 U.S.C. 154(b) by 0 days.

(21) Appl. No.: 13/347,486

(22) Filed: Jan. 10, 2012

(65) Prior Publication Data
US 2012/0103120 A1 May 3, 2012

Related U.S. Application Data

(62) Division of application No. 12/051,996, filed on Mar. 20, 2008, now Pat. No. 8,104,369.

(30) Foreign Application Priority Data

Mar. 20, 2007 (JP) ................................. 2007-073625
Mar. 28, 2007 (JP) ................................. 2007-085678

(51) Int. Cl.
*F16H 1/04* (2006.01)

(52) U.S. Cl.
USPC ......................... 74/422; 74/388 PS; 29/897.2

(58) Field of Classification Search
USPC ................ 74/89.12, 388 PS, 422, 89.11, 120, 74/457; 29/893.34, 893.3, 893.35, 897, 897.2
See application file for complete search history.

(56) References Cited

U.S. PATENT DOCUMENTS

| | | | | |
|---|---|---|---|---|
| 6,898,853 | B2 * | 5/2005 | Tsubouchi et al. | 29/893.34 |
| 7,069,764 | B2 * | 7/2006 | Tsubouchi et al. | 72/379.2 |
| 7,207,231 | B2 * | 4/2007 | Saarinen | 74/388 PS |
| 7,225,541 | B2 * | 6/2007 | Kubota | 29/897.2 |
| 7,654,165 | B2 * | 2/2010 | Roeske | 74/388 PS |
| 7,926,378 | B2 * | 4/2011 | Saito et al. | 74/422 |

FOREIGN PATENT DOCUMENTS

| | | |
|---|---|---|
| CN | 1465451 A | 1/2004 |
| EP | 0572105 A1 | 12/1993 |
| GB | 2007569 A | 5/1979 |
| JP | 59092141 A | 5/1984 |
| JP | 6-85174 A | 3/1994 |
| JP | 6-264147 A | 9/1994 |
| JP | 6-264992 A | 9/1994 |

(Continued)

OTHER PUBLICATIONS

Apr. 3, 2012 Office Action for JP Application No. 2007-085678.

(Continued)

*Primary Examiner* — Robert Pezzuto
(74) *Attorney, Agent, or Firm* — Baker & Hostetler LLP

(57) ABSTRACT

The one end side portion is nipped by a jig including a jig member having a pair of convex portions which are to be fitted to a depressions in contact with a tooth side face and a inclined portion and positioning a bar and a jig member which is to be clamped/opened with respect to the jig member. A die having an inside diameter smaller than the diameter of the outer periphery is pressed onto the outer periphery of the end portion of the cylindrical end side portion projected from the jig up to a press-in depth determined preliminarily based on the rack, so as to reduce the diameter of the end portion.

3 Claims, 15 Drawing Sheets

FOREIGN PATENT DOCUMENTS

| | | |
|---|---|---|
| JP | 9-58488 A | 3/1997 |
| JP | 2000 094082 A | 4/2000 |
| JP | 2001-11536 A | 1/2001 |
| JP | 2001-163228 A | 6/2001 |
| JP | 2004-1679 A | 8/2001 |
| JP | 2003-160812 A | 6/2003 |
| JP | 2003-164941 A | 6/2003 |
| JP | 2003-312489 A | 11/2003 |
| JP | 2004-131823 A | 4/2004 |
| JP | 2004-359009 A | 12/2004 |
| JP | 2006-123852 A | 5/2006 |

OTHER PUBLICATIONS

Apr. 1, 2013 Office Action for JP Application No. 201110080424.X; Search Report for JP Application No. 201110080424.X.

* cited by examiner

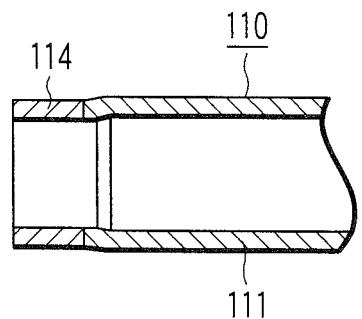
F I G. 12A
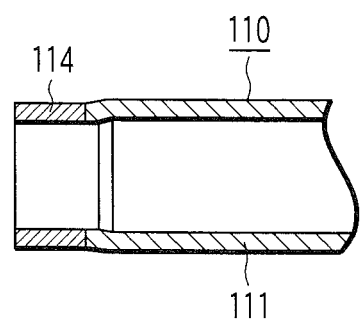
F I G. 12B
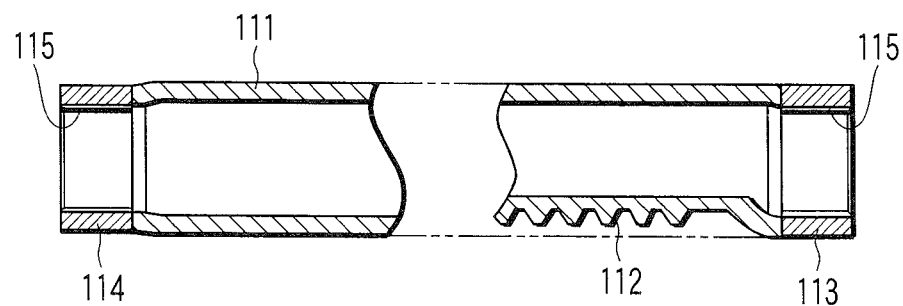
F I G. 13

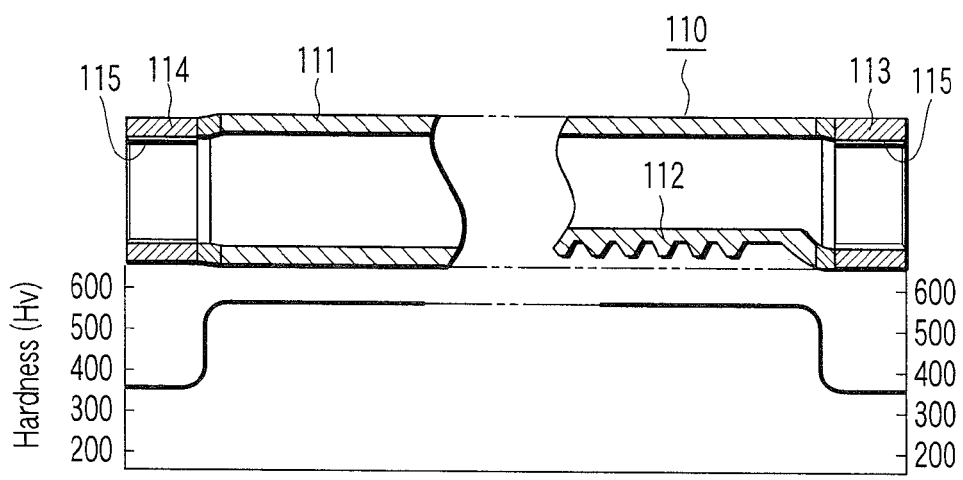
F I G. 16
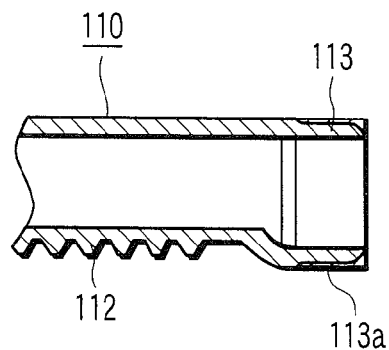
F I G. 17A
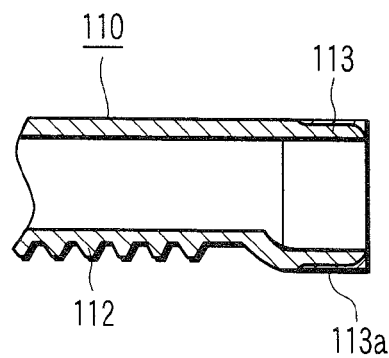
F I G. 17B

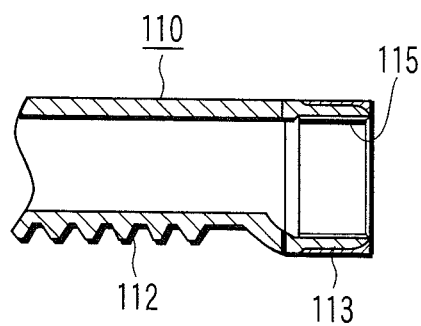
F I G. 20A
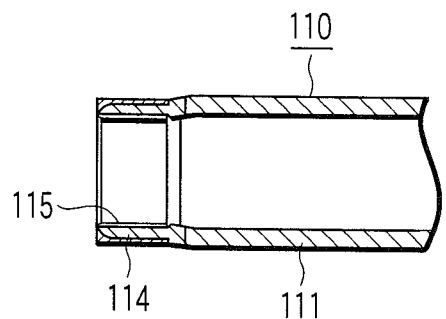
F I G. 20B
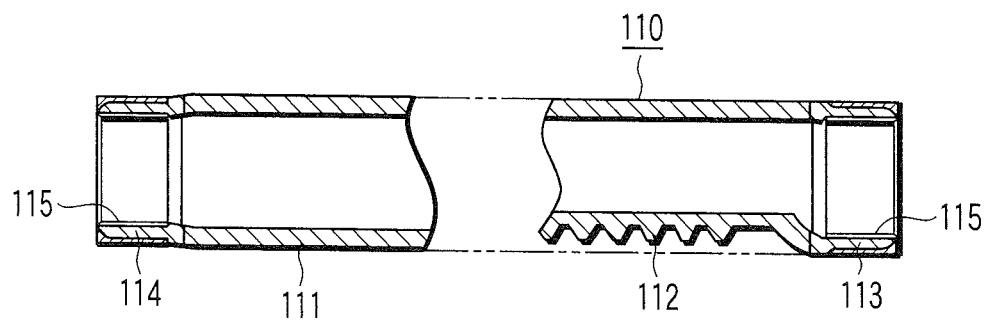
F I G. 21

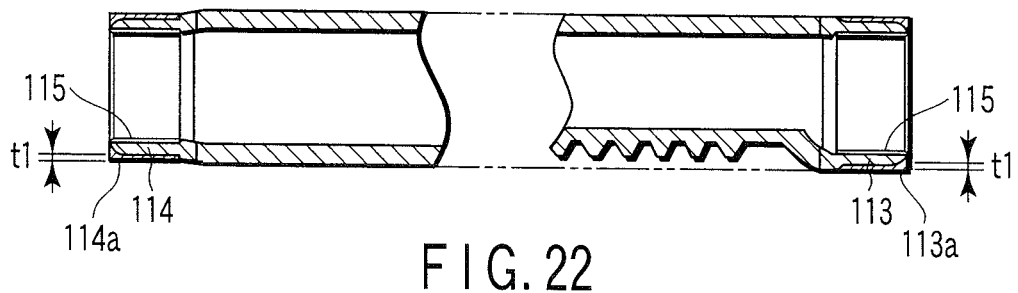
F I G. 22
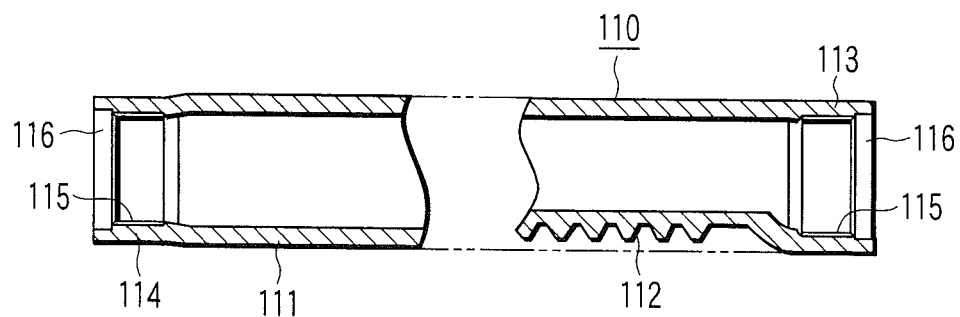
F I G. 23
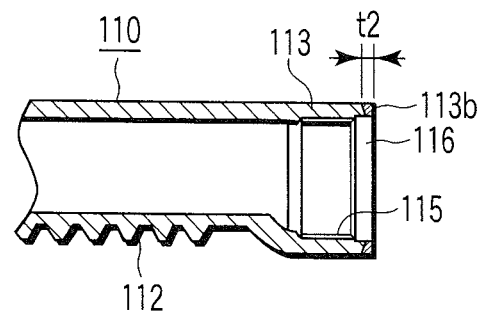
F I G. 24A
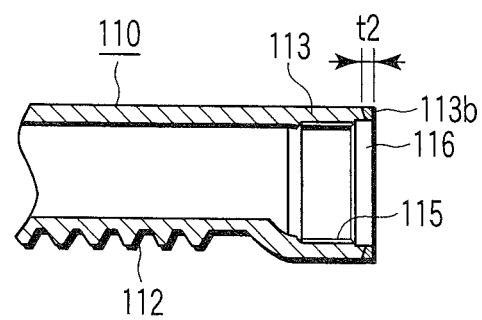
F I G. 24B

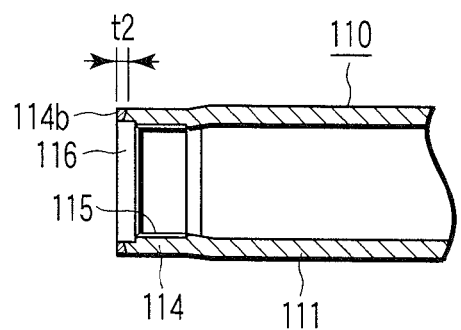
F I G. 25A
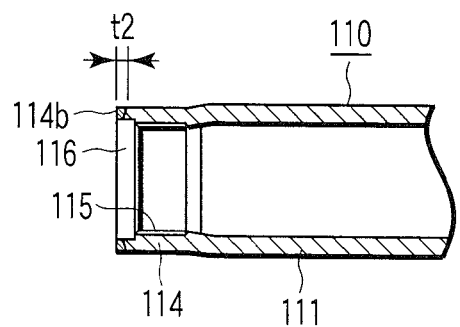
F I G. 25B
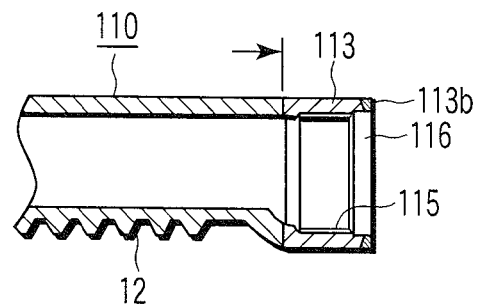
F I G. 26A
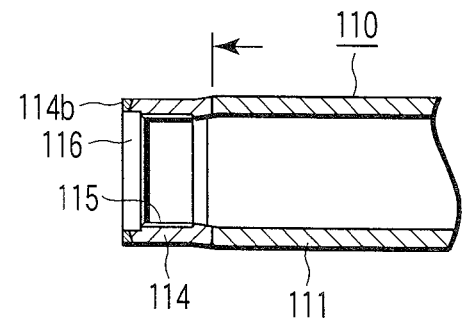
F I G. 26B

HOLLOW RACK AND HOLLOW RACK MANUFACTURING METHOD

CROSS-REFERENCE TO RELATED APPLICATIONS

This application is a Division of U.S. patent application Ser. No. 12/051,996 (filed on Mar. 20, 2008), which claims priority to Foreign Patent Application Nos. JP 2007-073625 (filed on Mar. 20, 2007) and JP 2007-085678 (filed on Mar. 28, 2007). All three disclosures are incorporated herein by reference in their entirety.

BACKGROUND OF THE INVENTION

1. Field of the Invention

The present invention relates to a hollow rack for use as a steering rack in a traveling body having wheels, for example, automotive steering system and a method and an apparatus for reducing the diameter of an end portion of this rack. Further, the present invention relates to a method for manufacturing the hollow rack for use in a rack and pinion used in an automotive power steering system or the like and a hollow rack, particularly to increasing the strength of an end portion including a screw portion.

2. Description of the Related Art

Conventionally, there has been known a method and an apparatus for forming a rack corresponding to a tooth profile of an upper die in a pipe material with a core metal inserted into the pipe material held by a die assembly including an upper die and a lower die ($21^{st}$ line on right column of page 1 to $29^{th}$ line on left column of page 2 and FIGS. 1 to 4 of JP Patent Application KOKOKU Publication No. 62-16735).

A step portion for improving the assembly and disassembly properties around a tie-rod is formed at an end portion in the length direction of the hollow rack manufactured according to this technology.

JP Patent Application KOKOKU Publication No. 62-16735 ($21^{st}$ line on right column of page 1 to $29^{th}$ line on left column of page 2 and FIGS. 1 to 4) describes nothing about any specific method and apparatus for forming the step portion at the end portion of the hollow rack.

The step portion is formed by grinding the outer periphery of an end portion of the hollow rack by cutting or pressing a compression die into the outer periphery of the end portion of the hollow rack to reduce the diameter of the end portion. The latter method is more advantageous than the former method in that the strength of the end portion of the hollow rack is not lowered.

By the way, the length between the stepped portion and the rack is determined depending on the steering system of various vehicles. To satisfy such a demand, the inventor of the present invention has implemented a processing for reducing the diameter of an end portion on one side continuous to the other end side in which the rack is formed of the hollow rack currently in the following procedure.

First, with the center of the rack in the length direction regarded as a first processing criterion, an end side portion of the hollow rack is cut out at a position apart from that by a predetermined dimension so as to form an end face which serves as a second processing criterion. Next, a press-in depth for a compression die to the end portion of the other end side of the hollow rack is set with a predetermined distance apart from this end face. Next, the compression die is pressed onto the outer periphery of the end portion of the other end side of the hollow rack up to this press-in depth so as to reduce the diameter of the end portion of the other end side. In this case, a supporting member which is set in contact with the end face which serves as the second processing criterion receives the press-in load of pressing in the compression die.

To set up the press-in depth of the compression die for reducing the diameter of the end portion of the other end side of the hollow rack, the end face of one end side of the hollow rack positioned on an opposite side to the end portion of the other end side is used as a criterion. In such a processing method, the portion of the one end side of the hollow rack needs to be ground with the center of the rack in the length direction regarded as the first processing criterion, whereby cost for that is required.

On the other hand, a solid rack for use in a power steering system of a vehicle includes a tooth portion which is engaged with a pinion at its intermediate portion and a threaded portion for connecting with a ball joint is formed at an end portion thereof.

The solid rack is formed of a solid material composed of tempered material such as S45C. Although the S45C has hardness of Hv240-285, the shaft portion positioned at the intermediate portion has hardness of Hv600 or higher by heat treatment after the tooth portion is formed by cutting. The threaded portion positioned at the end portion maintains hardness of the material for a processing.

FIG. 29 is a diagram showing an example of a hollow rack developed recently in place of the solid rack. A hollow rack 200 includes a hollow shaft portion 201, and a tooth portion 202 which is engaged with a pinion (not shown) is formed at an intermediate portion of this shaft portion 201 while an internal threaded portion 204 for connecting with the ball joint is provided in an end portion 203 thereof. In the same Figure, reference number 210 denotes a ball joint, and reference number 211 denotes a socket for connecting the ball joint 210 with the end portion 203 via an external threaded portion 212.

In the meantime, technology for high-frequency heating the hollow rack and technology for changing the heat treatment condition partially have been generally known (see, for example, JP Patent Application KOKAI Publication Nos. 63-297524 and 6-264147).

The above-mentioned hollow rack has the following problems. That is, with increased size of vehicles in recent years, input load from tire to the rack and pinion has tended to increase. However, although the shaft portion 201 can be supplied with a higher hardness by heat treatment, the hardness of the end portion 203 cannot be intensified for thread cutting. For this reason, when strength test (arrow K in FIG. 29) of inputting a load from a ball joint 210 disposed on the side of tire is carried out, sometimes a screw can loosen due to shortage of the strength of the end portion 203 or the internal threaded portion or the ball joint 210 can slip out as shown in FIG. 30.

BRIEF SUMMARY OF THE INVENTION

An object of the present invention is to provide a hollow rack end portion diameter reducing method, apparatus and a hollow rack capable of reducing the number of processing steps in reducing the diameter of an end portion of the hollow rack.

A hollow rack end portion diameter reducing method according to the invention processes a hollow bar in which a rack is formed at a portion on one end side thereof and a depression is formed between a rack tooth on each of both ends of the rack and an adjoining portion having an inclined portion opposing a tooth side face of the rack tooth and continuous to each of the both ends of the rack, so as to narrow an end portion of a portion on the cylindrical other end side of the hollow bar, the method comprising: nipping the portion on the one end side with a jig including a first jig member having a pair of convex portions which are to be fitted to the depressions in contact with the tooth side face and the inclined portion and positioning the hollow bar and a second jig member which is to be clamped/opened with respect to the first jig member; and pressing a compression die having an inside diameter smaller than the diameter of the outside periphery of the portion on the other end side onto the outer periphery of the end portion on the other end side projected from the jig up to a press-in depth determined preliminarily based on the rack such that the die approaches the jig so as to deform the end portion on the other end side plastically whereby the end is narrowed.

A hollow rack end portion diameter reducing apparatus according to the invention processes a hollow bar in which a rack is formed at a portion on one end side thereof and a depression is formed between a rack tooth on each of both ends of the rack and an adjoining portion having an inclined portion opposing a tooth side face of the rack tooth and continuous to each of the both ends of the rack, so as to narrow an end portion of a portion on the cylindrical other end side of the hollow bar, the apparatus comprising: a jig which includes a first jig member having a pair of convex portions which are to be fitted to the depressions in contact with the tooth side face and the inclined portion and positioning the hollow bar and a second jig member which is to be clamped/opened with respect to the first jig member, and nips the portion on the one end side between the both jig members detachably; a compression die which has an inside diameter smaller than the diameter of the outer periphery of the end portion on the other end side portion, and is to be removably pressed onto the outer periphery of the end portion on the other end side portion projected from the jig clamped together; and die driving means for reciprocating the compression die to press the compression die onto the outer periphery of the end portion on the other end side of the hollow bar up to a press-in depth determined preliminarily based on the rack and pulling out the compression die from this press-in state.

In a hollow rack of the invention in which a rack is formed at a portion on one end side while an end portion of the cylindrical other end side is narrowed by reducing a diameter thereof, an adjoining portion continuous to both ends of the rack has an inclined portion opposing each of tooth side faces of rack teeth positioned on both ends of the rack and a pressure contact trace is formed in the inclined portion so as to face a depression between the inclined portion and the tooth side face.

In the hollow rack end portion diameter reducing method and apparatus of the present invention, the press-in load for pressing the compression die onto the other end side portion of the hollow rack is received by the jig for positioning the hollow rack in engagement with the rack of the rack, and the press-in depth of the compression die is set based on the rack of the hollow rack positioned by the jig. Consequently, the number of processing steps for reducing the diameter of the end portion of the hollow rack can be reduced.

According to the hollow rack of the present invention, the number of processing steps for reducing the diameter of the end portion thereof can be reduced.

An object of the present invention is to provide a hollow rack manufacturing method for increasing the strength of the end portion while maintaining the processing accuracy of the internal threaded portion formed in the end portion and preventing delayed destruction and such a hollow rack.

There is provided a method for manufacturing a hollow rack having a tooth portion which meshes with a pinion in a shaft portion thereof while a threaded portion for connecting to a ball joint is formed in an inner peripheral face of an end portion thereof, comprising: a tooth forming step of forming a tooth portion in the shaft portion; an end hardening step of subjecting the end portion to high-frequency hardening; a first temperature end portion tempering step of subjecting the end portion to high-frequency tempering at a first temperature; a thread cutting step of cutting threads for forming the threaded portion in the inner periphery of the end portion after the first temperature tempering step; a tooth portion hardening step of subjecting the tooth portion to high-frequency hardening; a shaft portion hardening step of subjecting the shaft portion to high-frequency hardening; and a second temperature tempering step of subjecting the end portion, the tooth portion and the shaft portion to high-frequency tempering at a second temperature lower than the first temperature.

There is provided a method for manufacturing a hollow rack having a tooth portion which meshes with a pinion in a shaft portion thereof while an inner threaded portion for connecting to a ball joint is formed in an inner peripheral face of an end portion thereof, comprising: a tooth forming step of forming a tooth portion in the shaft portion; an end portion hardening step of subjecting an outer peripheral face of the end portion to high-frequency hardening; a first temperature tempering step of subjecting the outer periphery of the end portion to high-frequency tempering at a first temperature; a thread cutting step of cutting threads for forming the threaded portion in the inner periphery of the end portion after the first temperature tempering step; a tooth portion hardening step of subjecting the tooth portion to high-frequency hardening; a shaft portion hardening step of subjecting the shaft portion to high-frequency hardening; and a second temperature tempering step of subjecting the end portion, the tooth portion and the shaft portion to high-frequency tempering at a second temperature lower than the first temperature.

There is provided a method for manufacturing a hollow rack having a tooth portion which meshes with a pinion in a shaft portion thereof while an inner threaded portion for connecting to a ball joint is formed in an inner peripheral face of an end portion thereof, comprising: a tooth forming step of forming a tooth portion in the shaft portion; a recess processing step of forming a concave portion by performing recess processing in the inner periphery of the end portion from an opening side; a thread cutting step of cutting threads for forming the threaded portion on a deep side with respect to the concave portion in the inner periphery of the end portion; an end portion hardening step of subjecting an opening end of the end portion to high-frequency hardening; a tooth portion hardening step of subjecting the tooth portion to high-frequency hardening; a first temperature tempering step of subjecting the end portion to high-frequency tempering at a first temperature; a shaft portion hardening step of subjecting the shaft portion to high-frequency hardening; and a second temperature tempering step of subjecting the end portion, the tooth portion and the shaft portion to high-frequency tempering at a second temperature lower than the first temperature.

A hollow rack of the invention comprises: a hollow shaft portion having a tooth portion which meshes with a pinion; and an end portion which is provided in an inner peripheral face on at least one end of the shaft portion and in which a threaded portion for connecting with a ball joint is formed, wherein hardness of the shaft portion is set higher than hardness of the end portion.

According to the present invention, the strength of the end portion can be intensified while the processing accuracy of the threaded portion formed in the end portion is maintained and the delayed destruction is prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 12A is a longitudinal sectional view showing the heat treatment process (high-frequency hardening) for a shaft side end portion of the hollow rack;

FIG. 12B is a longitudinal sectional view showing the heat treatment process (high-frequency tempering) for the shaft side end portion of the hollow rack;

FIG. 13 is a longitudinal sectional view showing thread cutting process for the tooth side end portion and shaft side end portion of the hollow rack;

FIG. 16 is a longitudinal sectional view showing hardness of the hollow rack;

FIG. 17A is a longitudinal sectional view showing heat treatment process (high-frequency hardening) for the tooth side end portion of the hollow rack;

FIG. 17B is a longitudinal sectional view showing heat treatment process (high-frequency tempering) for the tooth side end portion of the hollow rack;

FIG. 20A is a longitudinal sectional view showing heat treatment process (high-frequency hardening) for the tooth portion of the hollow rack;

FIG. 20B is a longitudinal sectional view showing heat treatment process (high-frequency hardening) for the shaft portion of the hollow rack;

FIG. 21 is a longitudinal sectional view showing heat treatment process (high-frequency tempering) of the hollow rack;

FIG. 22 is a longitudinal sectional view showing the hollow rack;

FIG. 23 is a longitudinal sectional view showing thread cutting process for the tooth side end portion and shaft side end portion of the hollow rack;

FIG. 24A is a longitudinal sectional view showing heat treatment process (high-frequency hardening) for the tooth side end portion of the hollow rack;

FIG. 24B is a longitudinal sectional view showing heat treatment process (high-frequency tempering) for the tooth side end portion of the hollow rack;

FIG. 25A is a longitudinal sectional view showing the heat treatment process (high-frequency hardening) for a shaft side end portion of the hollow rack;

FIG. 25B is a longitudinal sectional view showing the heat treatment process (high-frequency tempering) for the shaft side end portion of the hollow rack;

FIG. 26A is a longitudinal sectional view showing heat treatment process (high-frequency hardening) for the tooth portion of the hollow rack;

FIG. 26B is a longitudinal sectional view showing heat treatment process (high-frequency hardening) for the shaft portion of the hollow rack;

DETAILED DESCRIPTION OF THE INVENTION

Figure 1:
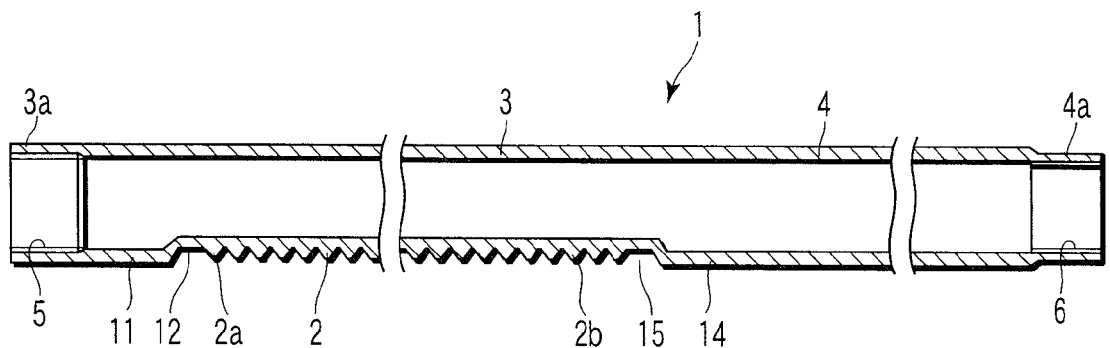
FIG. 1 is a sectional view showing a hollow rack.

FIGS. 1 to 8 are diagrams showing a first embodiment of the present invention. Reference number 1 in FIG. 1 denotes a hollow rack (hereinafter referred to as rack) for use as a hollow steering rack shaft of an automotive power steering system. Both ends in a direction of extension of the axis of the rack 1 (hereinafter referred to as axial direction) are open.

A rack 2 is formed in the outer face of a portion near an opening at one end of the rack 1. This rack 2 is formed by arranging plural rack teeth in the axial direction of the rack 1. The rack 2 is formed on the outer face of a processing wall portion provided by crushing part of a tubular wall near an opening at one end of a steel pipe which is a raw material of the rack 1 into a flat surface by pressing inward of the steel pipe. This rack 2 is formed by plastically fluidizing the flesh of a processing wall portion by pressing toward the tooth die of a second die from inside of the steel pipe using plural core metals each having a different size with part of the steel pipe having the processing wall portion sandwiched between a first die (not shown) and the second die having the tooth die corresponding to the rack 2.

A portion other than a portion provided with the rack 2 is formed cylindrically in the axial direction of the rack 1 and the portion having the formed rack 2 is not cylindrical although it is tubular. The portion on one end in which the rack 2 exists in the axial direction of the rack 1 is called a tooth side portion 3 in this specification while the portion on the other end is called a shaft side portion 4.

A female screw 5 is provided on the inner peripheral face of an end portion 3a of the tooth side portion 3. The shaft side portion 4 is longer than the tooth side portion 3. An end portion 4a of the shaft side portion 4 has a reduced diameter and a female screw 6 is provided on the inner peripheral face. An end portion of a ball joint for connecting the rack 1 to a wheel of a vehicle (not shown) is screwed onto each of the female screws 5, 6. The end portion 4a of the shaft side portion 4 is formed into a desired diameter by diameter reducing processing described later so as to form the female screw 6 suitable for the ball joint to be attached thereto.

Figure 2:
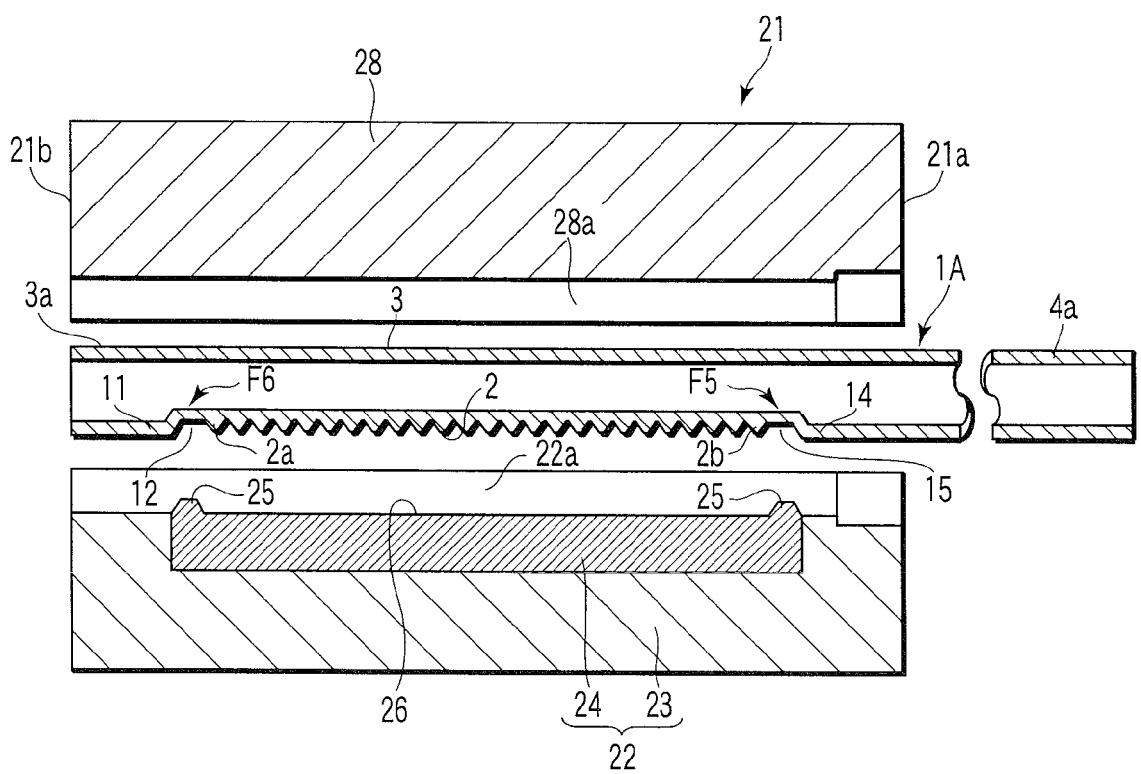
FIG. 2 is a sectional view showing an example of an end portion diameter reducing apparatus for carrying out a manufacturing method of the present invention when a jig of this apparatus is opened.
Figure 3:
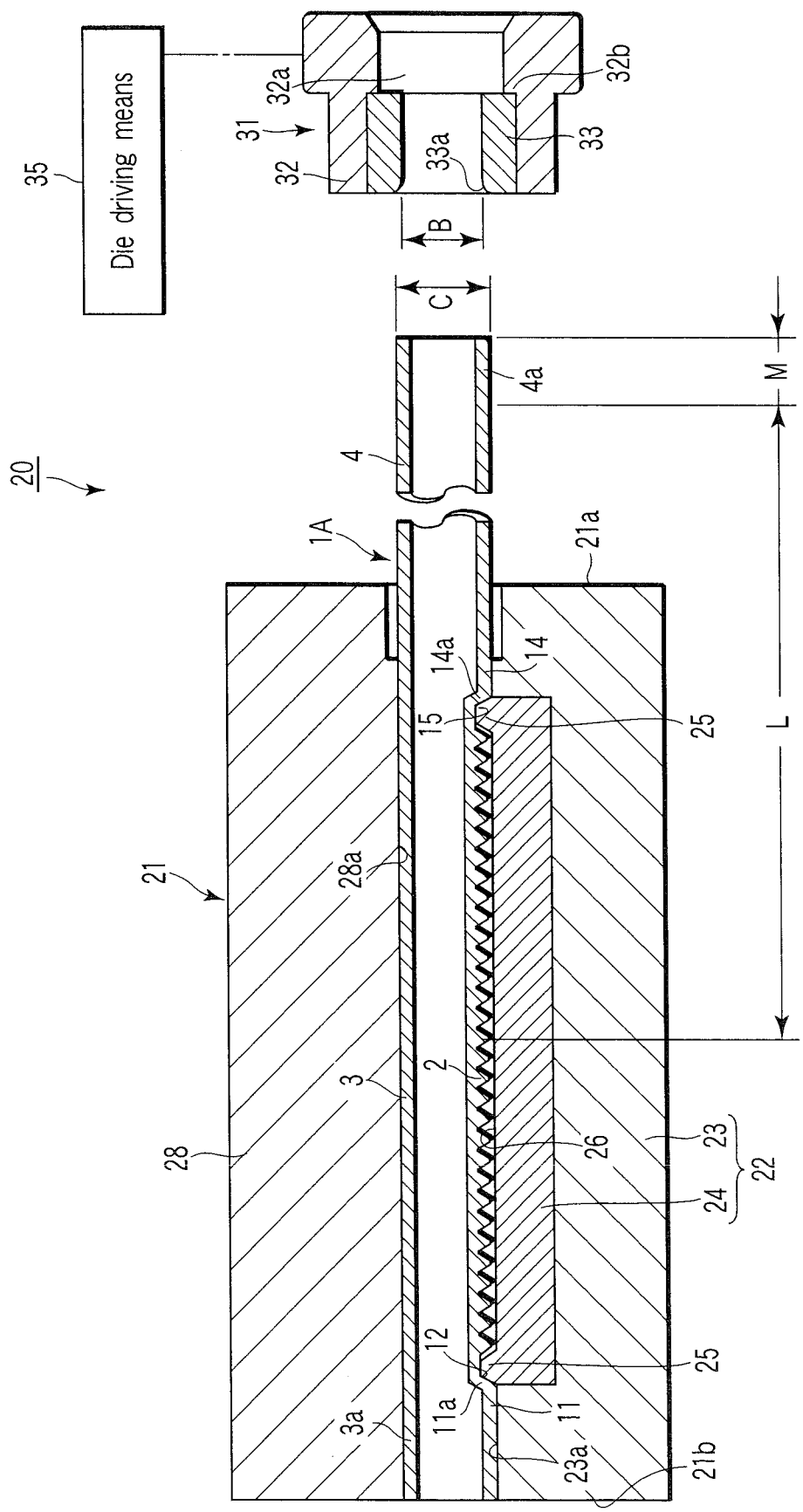
FIG. 3 is a sectional view showing an example of the end portion diameter reducing apparatus for carrying out the manufacturing method of the present invention when the jig of this apparatus is clamped.
Figure 4:
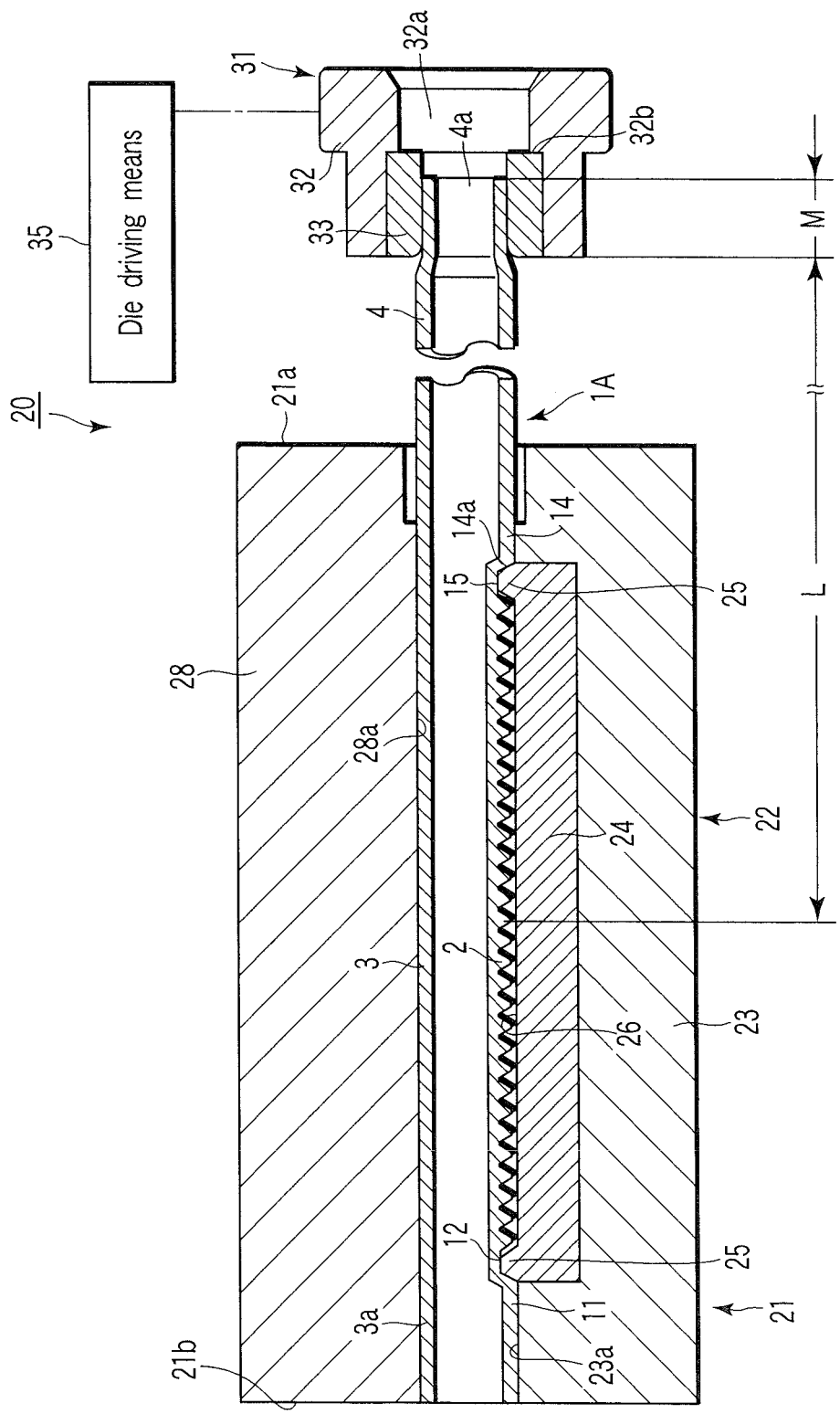
FIG. 4 is a sectional view showing an example of the end portion diameter reducing apparatus for carrying out the manufacturing method of the present invention when an end portion of the hollow rack is subjected to diameter reducing processing.

Next, a hollow bar 1A which is an object for processing for obtaining the rack 1 will be described. Although the hollow bar 1A is not subjected to the female screw processing for the end portions 3a, 4a and the diameter reducing processing for the end portion 4a, as shown in FIGS. 2 to 4, the rack 2 is formed on the tooth side portion 3 of this hollow bar 1A according to the above-described method.

Figure 6:
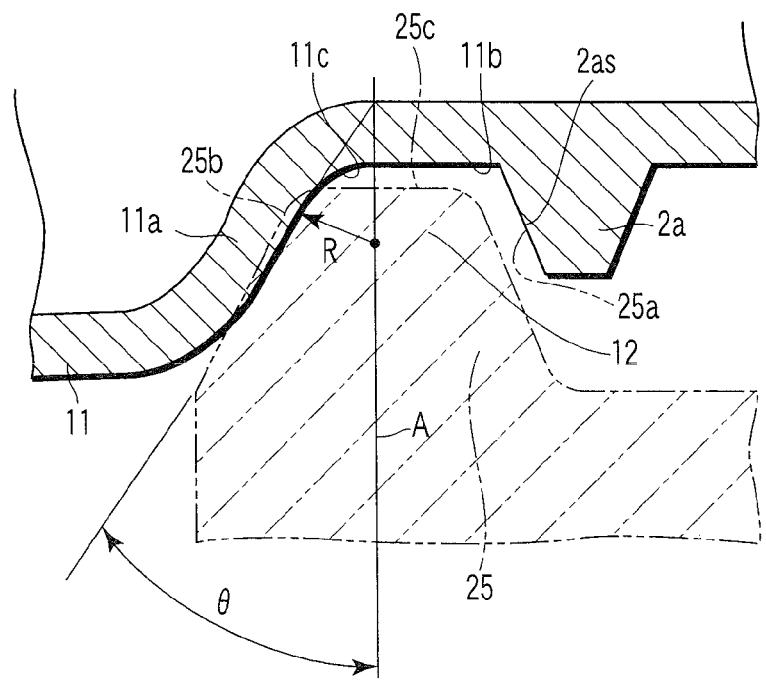
FIG. 6 is a sectional view showing a portion F6 in FIG. 2 in enlargement.

As shown in FIG. 6, a depression 12 is formed between a rack tooth 2a positioned at an end of the rack 2 of the hollow bar 1A and an adjoining portion 11 continuous thereto. The adjoining portion 11 is formed of part of the end portion 3a. This adjoining portion 11 has an inclined portion 11a which opposes a tooth side face 2as of the rack tooth 2a.

The inclined portion 11a is continuous to the root of the rack tooth 2a through a flat face 11b and a circular face 11c. The flat face 11b is continuous to the root of the rack tooth 2a and the circular face 11c is continuous to the flat face 11b and the inclined portion 11a. An angle θ defined by a perpendicular line A falling to the flat face 11b and the inclined portion 11a is preferred to be 25° or more. The radius R of the circular face 11c is preferred to be 0.5 mm or more.

Figure 5:
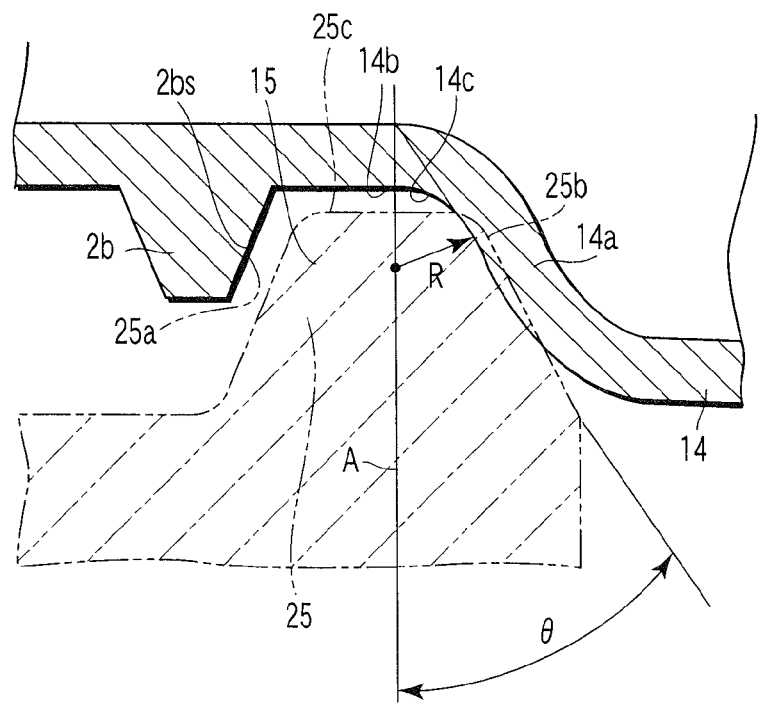
FIG. 5 is a sectional view showing a portion F5 in FIG. 2 in enlargement.

Similarly as shown in FIG. 5, a depression 15 is formed between the rack tooth 2b positioned at the other end of the rack 2 of the hollow bar 1A and an adjoining portion 14 continuous thereto. The adjoining portion 14 is formed of part of the shaft side portion 4. This adjoining portion 14 has an inclined portion 14a which opposes a tooth side face 2bs of the rack tooth 2b.

The inclined portion 14a is continuous to the root of the rack tooth 2b through a flat face 14b and a circular face 14c. The flat face 14b is continuous to the root of the rack tooth 2b and the circular face 14c is continuous to the flat face 14b and the inclined portion 14a. An angle θ defined by a perpendicular line A falling to the flat face 14b and the inclined portion 14a is preferred to be 25° or more. The radius R of the circular face 14c is preferred to be 0.5 mm or more.

As shown in FIGS. 2 to 4, an end portion diameter reducing apparatus 20 for the hollow rack of performing a processing for reducing the diameter of the end portion 4a of the hollow bar 1A includes a jig 21, a compression die 31, die driving means 35 and the like.

The jig 21 includes a chuck lower die 22 as a first jig member, a chuck upper die 28 as a second jig member and a die clamping mechanism (not shown).

The chuck lower die 22 is fixed and a positioning member 24 is mounted detachably on a lower die base 23. The lower die base 23 has a setting groove 22a in its top face. The positioning member 24 is installed at an intermediate portion in the length direction of the setting groove 22a.

The positioning member 24 integrally has a convex portion 25 on each of both end portions in the length direction thereof. A pair of the convex portions 25 is provided at the same interval as that between a pair of the depressions 15 formed in the hollow bar 1A and projected upward into the setting groove 22a. These convex portions 25 are fitted into the depressions 12, 15 formed on both sides in the length direction of the rack 2 of the hollow bar 1A when the hollow bar 1A is set in the setting groove 22a so as to position the hollow bar 1A in the jig 21.

As shown in FIGS. 5 and 6, each convex portion 25 has a tooth side face 2as of the rack tooth 2a positioned at an end of the rack 2 or a first side face 25a which does not make contact with the tooth side face 2bs of the rack tooth 2b, a second side face 25b which makes contact with the inclined portion 11a or the inclined portion 14a and a front end face 25c stretching between these both side faces. By configuring so that the first side face 25a does not make contact with the tooth side face 2as or 2bs, the rack tooth 2a, 2b can be prevented from being deformed by the convex portion 25.

A portion between the pair of the convex portions 25 of the positioning member 24 serves as a recess portion 26 which is depressed relative to the convex portions 25. This recess portion 26c is provided to prevent the rack 2 from making contact with the positioning member 24 except the convex portions 25 when the hollow bar 1A is held by the jig 21.

The chuck upper die 28 is clamped against from above and opened to the chuck lower die 22 by the die clamping mechanism. This chuck upper die 28 has a setting groove 28a in its bottom face. When the jig 21 is clamped together as shown in FIGS. 3 and 4, the setting grooves 22a, 28a are matched so as to sandwich the hollow bar 1A from up and down. In this case, the tooth side portion 3 of the hollow bar 1A in which the rack 2 is formed is sandwiched by the jig 21 and most of the shaft side portion 4 is projected horizontally from the side face 21a of the jig 21.

The compression die 31 is disposed to oppose the side face 21a in which the hollow bar 1A is projected from the jig 21. The compression die 31 includes a die holder 32 having a stepped through hole 32a extending horizontally and a cylindrical die 33 which is positioned on a step portion 32b of the through hole 32a and fixed within the die holder 32. As shown in FIG. 3, the inside diameter B of the die 33 is smaller than a diameter C of the outer circumference of the end portion 4a of the shaft side portion 4 of the hollow bar 1A. In an entrance of the die 33, its introducing face 33a which can be pressed onto the outer periphery of the end portion 4a smoothly is formed continuous around the circumference of the entrance.

The compression die 31 is moved in a direction of approaching/leaving the side face 21a of the jig 21 by the die driving means 35. Although a servo motor may be used as the driving source of the die driving means 35, this embodiment uses a hydraulic cylinder. If the servo motor is used, the motion of the compression die 31 can be controlled easily. Thus, this embodiment can cope with the length of a portion whose diameter is reduced of the end portion 4a, in other words, a change in press-in depth M of the compression die 31 to the end portion 4a easily depending on a difference in the length of the hollow bar 1A.

Next, the procedure for reducing the diameter of the end portion 4a of the hollow bar 1A with the end portion diameter reducing apparatus 20 will be described.

FIG. 2 shows a state in which the jig 21 is opened. In this state, the chuck upper die 28 is disposed apart from and above the chuck lower die 22. The compression die 31 is retreated sideways of the jig 21 with a space which allows the hollow bar 1A to be taken out of/into the jig 21 from the side face 21a of the jig 21.

With this state, the tooth side portion 3 of the hollow bar 1A is set in the jig 21 with a work handling mechanism (not shown). In this case, the hollow bar 1A is carried in between the chuck upper die 28 and the chuck lower die 22 with the rack 2 directed downward, after which the bottom portion of the tooth side portion 3 is lowered such that it is accommodated in and supported by the setting groove 22a in the chuck lower die 22. Accompanied by this, the pair of the convex portions 25 of the positioning member 24 is fitted into each of the depressions 12, 15 provided on both ends in the length direction of the rack 2.

Consequently, the hollow bar 1A is fixed with respect to the chuck lower die 22 temporarily. In this state, most of the shaft side portion 4 of the hollow bar 1A is projected form the side face 21a of the jig 21. In the meantime, although the end face of the end portion 3a of the tooth side portion 3 of the hollow bar 1A is disposed flush with the other side face 21b of the jig 21, accompanied by this positioning, the tooth side portion 3 may be projected from the other side face 21b.

Next, the jig 21 is clamped so as to accommodate the upper portion of the tooth side portion 3 in the setting groove 28a in the chuck upper die 28, so that the tooth side portion 3 is sandwiched by the chuck upper die 28 and the chuck lower die 22 from up and down. FIG. 3 shows a state in which the jig 21 is clamped. Accompanied by this clamping, the pair of the convex portions 25 invades deeply into the pair of the depressions 12, 15 with which they are fitted. Consequently, the second side face 25b of the convex portion 25 is pressed by the inclined portions 11a, 14a of the depressions 12, 15 so as to increase the positioning.

Figure 7:
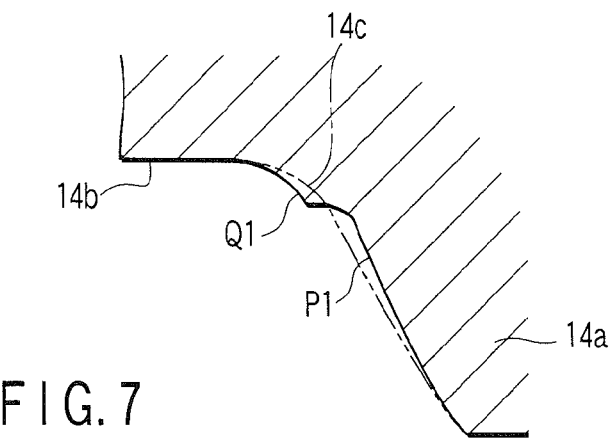
FIG. 7 is a sectional view showing an adjoining portion continuous to an end of the rack of the hollow rack held by clamping in the end portion diameter reducing apparatus for carrying out the manufacturing method of the present invention in enlargement.

Accompanied by the clamping, a pressure contact trace corresponding to the second side face 25b, that is, a depressed pressure trace P1, is formed in the inclined portion 14a (11a) as indicated in FIG. 7. In the meantime, the front end face 25c of the convex portion 25 does not reach the flat faces 11b, 14b of the depressions 12, 15. Thus, accompanied by the formation of the pressure trace P1, part of flesh of the inclined portion 14a (11a) is fluidized plastically and consequently, a stepped portion Q1 is formed between the pressure trace P1 and the flat face 14b (11b).

After that, the die driving means 35 is operated to move the compression die 31 in a direction of approaching the side face 21a of the jig 21. Consequently, the die 33 of the compression die 31 is pressed onto the outer periphery of the end portion 4a of the shaft side portion 4 projected from the jig 21 of the hollow bar 1A, so that this end portion 4a is compressed. Press-in load of the compression die 31 acting on the hollow bar 1A upon the processing for reducing the diameter can be received by the convex portion 25 of the jig 21.

In the end portion diameter reducing apparatus 20 for the processing of reducing the diameter, the dimensions of respective parts of the jig 21 are known and thus the position of a center in the length direction of the rack 2 of the hollow bar 1A positioned by the jig 21 as described above is also known. Thus, to adopt the length L from this center to the end portion 4a whose diameter is reduced as a predetermined value, the jig 21 or the rack 2 of the hollow bar 1A held by this jig 21 can be regarded as criterion for processing. Consequently, the press-in depth M of the compression die 31 to the end portion 4a of the shaft side portion 4 can be given easily by the servo motor of the die driving means 35.

Finally, the compression die 31 is moved in a direction of leaving the jig 21 by the die driving means 35 and this compression die 31 is pulled out of the end portion 4a of the shaft side portion 4. Subsequently, the jig 21 is opened and the hollow bar 1A is removed from the work handling mechanism to be ready for a next diameter reduction processing.

In the diameter reduction processing to be carried out in the above-described steps, a press-in load acting on the hollow bar 1A is not received by any supporting member placed on an end face of the end portion 3a of the hollow bar 1A when the hollow bar 1A is positioned. This press-in load is received by the convex portion 25 of the jig 21. At the same time, as a criterion for processing for pushing the compression die 31 up to the appropriate press-in depth M, the jig 21 or the rack 2 of the hollow bar 1A sandwiched by this jig 21 is used, not the end face of the end portion 3a of the hollow bar 1A. Thus, labor and time for grinding this end face can be omitted different from a case where the end face of the end portion 3a of the hollow bar 1A is adopted as the criterion for processing. Consequently, processing cost can be reduced.

Figure 8:
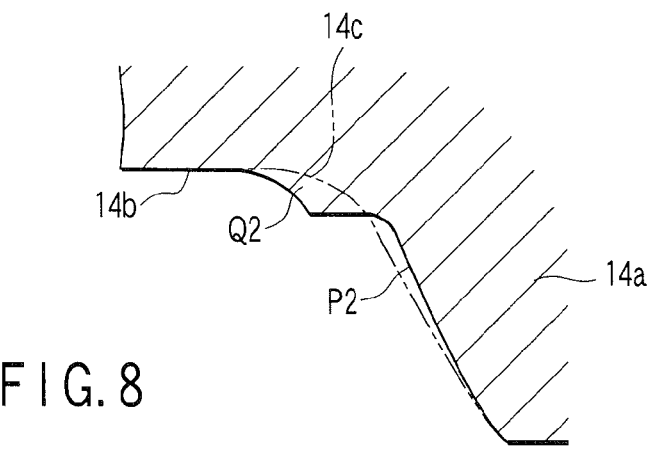
FIG. 8 is a sectional view showing an adjoining portion continuous to the other end of the rack of the hollow rack subjected to the diameter reducing processing by the end portion diameter reducing apparatus for carrying out the manufacturing method of the present invention in enlargement.

In the above-described diameter reduction processing, the inclined portion 14a is pressed strongly against the convex portion 25 in contact with the adjoining portion 14 to which the press-in load is applied. Thus, as shown in FIG. 8, the pressure contact trace in the inclined portion 14a corresponding to the second side face 25b of the convex portion 25 becomes deeper. Accompanied by such deep pressure contact trace P2, part of the flesh of the inclined portion 14a is fluidized plastically toward the flat face 14b. Based on this, a stepped portion Q2 is formed between the pressure contact trace P2 and the flat face 14b (11b).

In the adjoining portion 14 of the hollow bar 1A to be subjected to the diameter reduction processing in the above steps, as described already, the angle θ of the inclined portion 14a is 25° or more and the radius R of the circular face 14c is 0.5 mm or more. Consequently, concentration of stress around the inclined portion 14a of the adjoining portion 14 is suppressed, so that the strength of the hollow bar 1A can be maintained sufficiently although the pressure trace P2 is formed in the inclined portion 14a.

The present invention is not limited to the first embodiment but may be applied to a case of carrying out the diameter reduction processing to the end portion 3a of the tooth side portion 3 of the hollow bar 1A when it is formed into the rack 1. In this case, the jig 21 for holding the hollow bar 1A such that the end portion 3a is projected from the other end face 21b of the jig 21 is prepared. Then, after the hollow bar 1A is held by this jig 21, the compression die is pressed onto the outer periphery of the end portion 3a projected from the jig 21. Consequently, the diameter reduction processing can be implemented on the end portion 3a.

The diameter reduction processing to the end portion of the hollow bar to obtain the rack 1 may be processing for not only forming the female screw having a desired diameter at its end portion but also for avoiding an interference with various components disposed around the rack upon actual usage.

Figure 9:
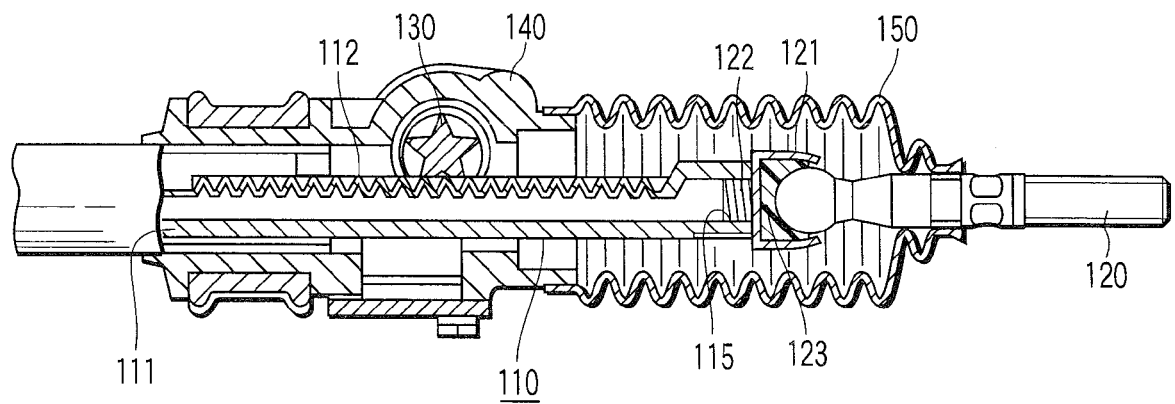
FIG. 9 is a longitudinal sectional view showing major portions of a rack and pinion incorporating the hollow rack according to an embodiment of the present invention.
Figure 10:
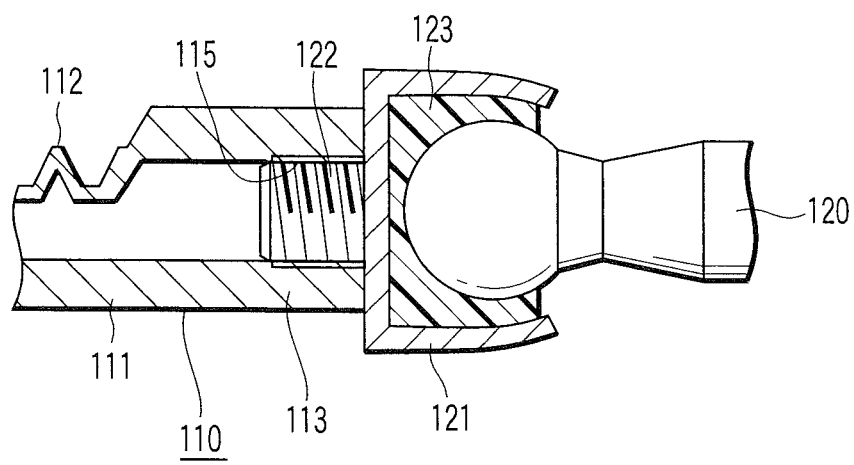
FIG. 10 is a longitudinal sectional view showing major portions of the hollow rack.

FIG. 9 is a longitudinal sectional view showing major portions of a rack and pinion incorporating a hollow rack 110 according to a second embodiment of the present invention. The hollow rack 110 has a tubular shaft portion 111, and a tooth portion 112 which meshes with a pinion 130 is formed in an intermediate portion of this axial portion 111. Further, a threaded portion 115 for connecting to a ball joint is provided on the inner peripheral faces of a tooth side end portion 113 and a shaft side end portion 114 positioned on both ends. The hollow rack 110 is formed of for example, such material as SMn433 and its initial hardness is Hv155 to 200.

On the other hand, a ball joint 120 is attached to the tooth side end portion 113 via a socket 121. The socket 121 has an outer threaded portion 122 which is screwed with the threaded portion 115. The socket 121 is structured to support the ball joint 120 swingably and includes resin seat 123. In the meantime, reference number 140 in FIG. 9 denotes casing and reference number 150 denotes bellows type boot.

The above-mentioned hollow rack 110 is formed as follows. That is, the tooth portion 112 is formed in the shaft portion 111 by cold transfer forging. More specifically, the top face is formed into a flat face together with tooth profile primary formation by pressurizing a pipe material with cold forging die and in a next process, a core metal is pressed into a cavity in the pipe material. The core metal is formed into a rod-like configuration and the flat portion of the pipe material has a tapered protrusion. When the protrusion engages the flat portion of the pipe material on its inner periphery, the flesh of the flat portion is fluidized plastically toward the tooth arrangement of the formation die so that it is stretched. As a result, the straight tooth portion 12 having a shape corresponding to the tooth arrangement of the formation die is applied to the flat portion on the outer periphery of the pipe material by the transfer method.

Next, hardness of the hollow rack 110 is raised and the threads are formed on the tooth side end portion 113 and the shaft side end portion 114. The raising of the hardness and formation of the threads are carried out in the following three methods.

Figure 11A:
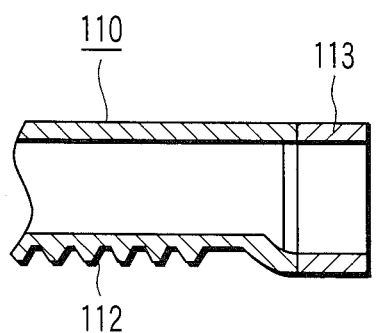
FIG. 11A is a longitudinal sectional view showing heat treatment process (high-frequency hardening) for a tooth side end portion of the hollow rack.
Figure 11B:
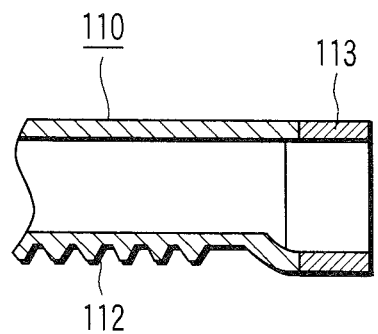
FIG. 11B is a longitudinal sectional view showing the heat treatment process (high-frequency tempering) for the tooth side end portion of the hollow rack.

The first processing method is as follows. That is, as shown in FIGS. 11A and 11B, the tooth side end portion 113 in which the tooth portion 112 is formed is subjected to high-frequency hardening at 1000° C. so as to raise the hardness to Hv620 (end portion hardening process). Next, the tooth side end portion 113 is subjected to high-frequency tempering at 600° C. (first temperature) (first temperature tempering process) so as to obtain hardness of Hv250 to 450. Likewise, as shown in FIGS. 12A and 12B, the shaft side end portion 114 is subjected to high-frequency hardening and high-frequency tempering so as to obtain a hardness of Hv250 to 450.

Next, as shown in FIG. 13, thread cutting is carried out to form the threaded portion 115 in the inner periphery of the tooth side end portion 113 and the shaft side end portion 114 (thread cutting processing).

Figure 14A:
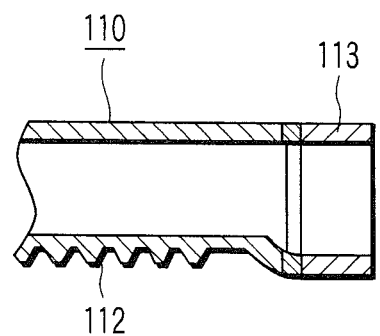
FIG. 14A is a longitudinal sectional view showing heat treatment process (high-frequency hardening) for the tooth portion of the hollow rack.
Figure 14B:
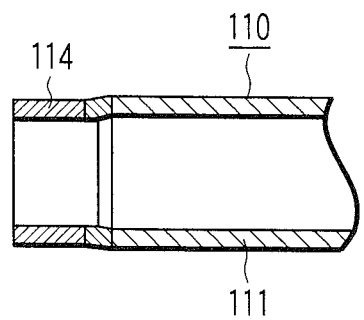
FIG. 14B is a longitudinal sectional view showing heat treatment process (high-frequency hardening) for the shaft portion of the hollow rack.
Figure 15:
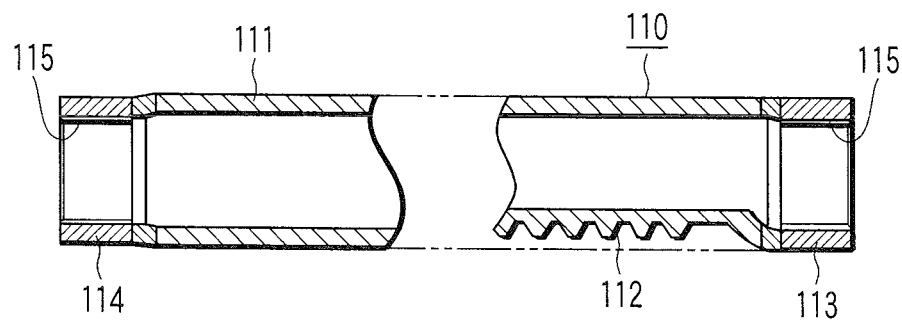
FIG. 15 is a longitudinal sectional view showing heat treatment process (high-frequency tempering) of the hollow rack.

Next, as shown in FIG. 14A, the tooth portion 112 is subjected to high-frequency hardening at 1000° C. so as to raise the hardness to Hv620. As shown in FIG. 14B, the shaft portion 111 of the shaft side end portion 14 is subjected to high-frequency hardening so as to raise the hardness to Hv620 (shaft portion hardening process). Next, as shown in FIG. 15, the entire hollow rack 110 is subjected to high-frequency tempering at 200° C. (second temperature) (second temperature tempering process).

According to the first processing method, the hardness as shown in FIG. 16 is obtained. That is, the hardness of the shaft portions 111a, 111b is Hv450 to 650 and the hardness of the tooth side end portion 113 is Hv250 to 450. Thus, not only is the strength of the tooth side end portion 13 against external force raised but also the processing accuracy of the threaded portion 115 can be maintained and delayed destruction can be prevented.

Figure 18A:
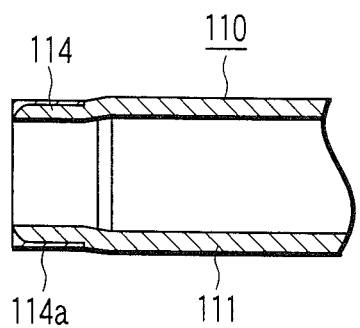
FIG. 18A is a longitudinal sectional view showing the heat treatment process (high-frequency hardening) for a shaft side end portion of the hollow rack.
Figure 18B:
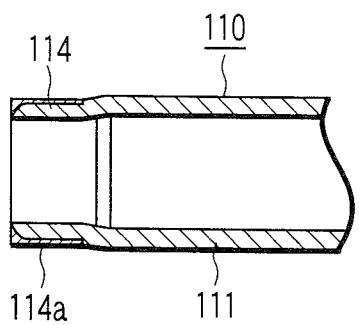
FIG. 18B is a longitudinal sectional view showing the heat treatment process (high-frequency tempering) for the shaft side end portion of the hollow rack.

The second processing method is as follows. That is, as shown in FIGS. 17A and 17B, the outer peripheral face 113a of the tooth side end portion 113 in which the tooth portion 112 is formed is subjected to high-frequency hardening at 1000° C. up to a depth t1 (about 0.5 to 1 mm) so as to raise the hardness to Hv620 (end portion hardening process). Next, the outer peripheral face 113a of the tooth side end portion 113 is subjected to high-frequency tempering (first temperature tempering) at 600° C. (first temperature) so as to obtain hardness of Hv250 to 450. Likewise, as shown in FIGS. 18A and 18B, an outer peripheral face 114a of the shaft side end portion 114 is subjected to high-frequency hardening/high-frequency tempering so as to obtain the hardness of Hv250 to 450.

Figure 19:
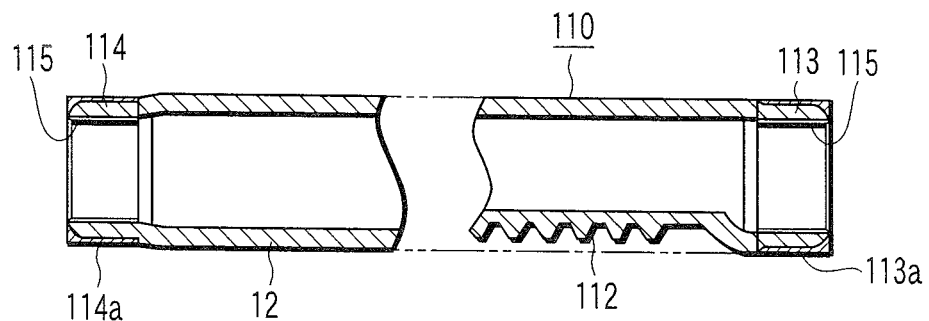
FIG. 19 is a longitudinal sectional view showing thread cutting process for the tooth side end portion and shaft side end portion of the hollow rack.

Next, as shown in FIG. 19, thread cutting for forming the threaded portion 115 is carried out on the inner periphery of the tooth side end portion 113 and the shaft side end portion 114 (thread cutting process).

Next, as shown in FIG. 20A, the tooth portion 112 is subjected to high-frequency hardening at 1000° C. so as to raise the hardness to Hv620. As shown in FIG. 20B, the shaft portion 111 of the shaft side end portion 114 is subjected to high-frequency hardening so as to raise the hardness to Hv620 (shaft portion hardening process). Next, as shown in FIG. 21, the entire hollow rack 110 is subjected to high-frequency tempering at 200° C. (second temperature) (second temperature tempering process).

As a result, the second processing method obtains the same hardness as shown in FIG. 16. That is, the hardness of the shaft portion 111 of the hollow rack 110 shown in FIG. 22 is Hv450 to 650 and the hardness of the tooth side end portion 113 is Hv250 to 450. Therefore, if the strength of the tooth side end portion 113 against an external force is raised, the processing accuracy of the threaded portion 115 can be maintained and the delayed destruction can be prevented.

The third processing method is as follows. That is, recess processing is carried out in the inner periphery of the tooth side end portion 113 and the shaft side end portion 114 from the opening side so as to form a concave portion 116 about 5 mm deep (recess processing). Next, thread cutting is carried out to form the threaded portion 115 on the deep side of the concave portion 116 in the inner periphery of the tooth side end portion 113 (thread cutting process). Next, as shown in FIGS. 24A and 24B, a portion t2 deep from an opening end 113b (within 5 mm) of the tooth side end portion 113 in which the tooth portion 112 is formed is subjected to high-frequency hardening at 1000° C. so as to raise the hardness to Hv620 (end portion hardening process). Next, the opening end 113b of the tooth side end portion 113 is subjected to high-frequency tempering at 600° C. (first temperature) (first temperature tempering process) so as to obtain hardness of for example Hv250 to 450. Likewise, as shown in FIGS. 25A and 25B, an opening end 114b of the shaft side end portion 114 is subjected to high-frequency hardening/high-frequency tempering so as to obtain hardness of Hv250 to 450. In the heat treatment process, no heat is transmitted to the threaded portion 115 to thereby maintain processing accuracy because the concave portion 116 is provided.

Figure 27:
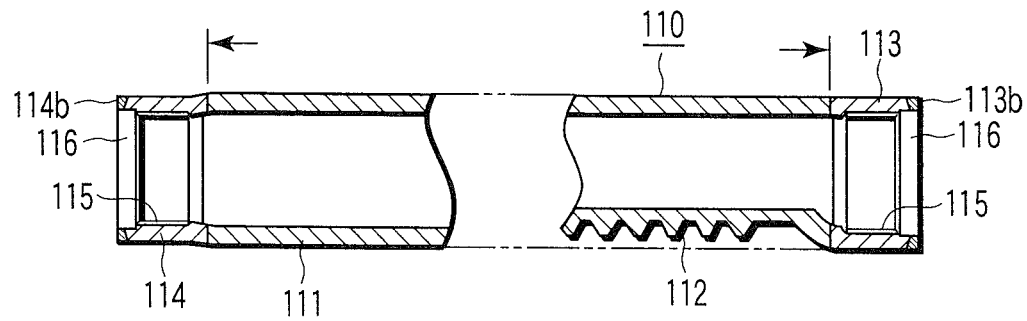
FIG. 27 is a longitudinal sectional view showing heat treatment process (high-frequency tempering) of the hollow rack.

Next, as shown in FIG. 26A, the tooth portion 112 is subjected to high-frequency hardening at 1000° C. so as to raise the hardness to Hv620. Likewise, as shown in FIG. 26B, the shaft portion 111 of the shaft side end portion 114 is subjected to high-frequency hardening so as to raise the hardness to Hv620 (shaft portion hardening process). Next, as shown in FIG. 27, the entire hollow rack 110 is subjected to high-frequency tempering at 200. quadrature. (second temperature) (second temperature tempering process).

Figure 28:
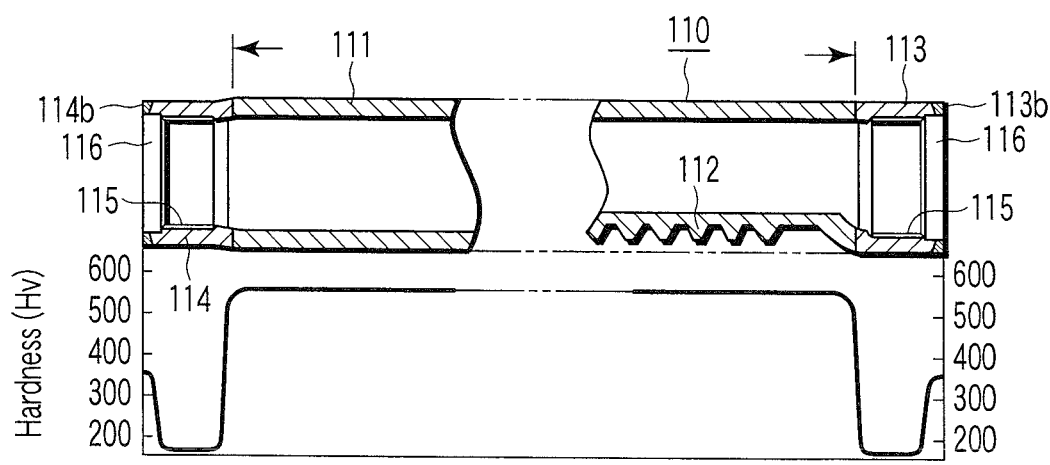
FIG. 28 is a longitudinal sectional view showing hardness of the hollow rack.
Figure 29:
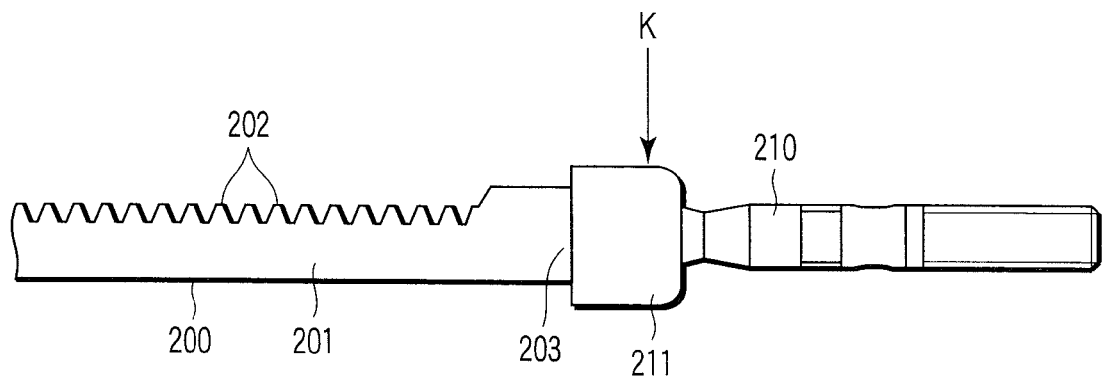
FIG. 29 is a side view showing a conventional hollow rack and ball joint.
Figure 30:
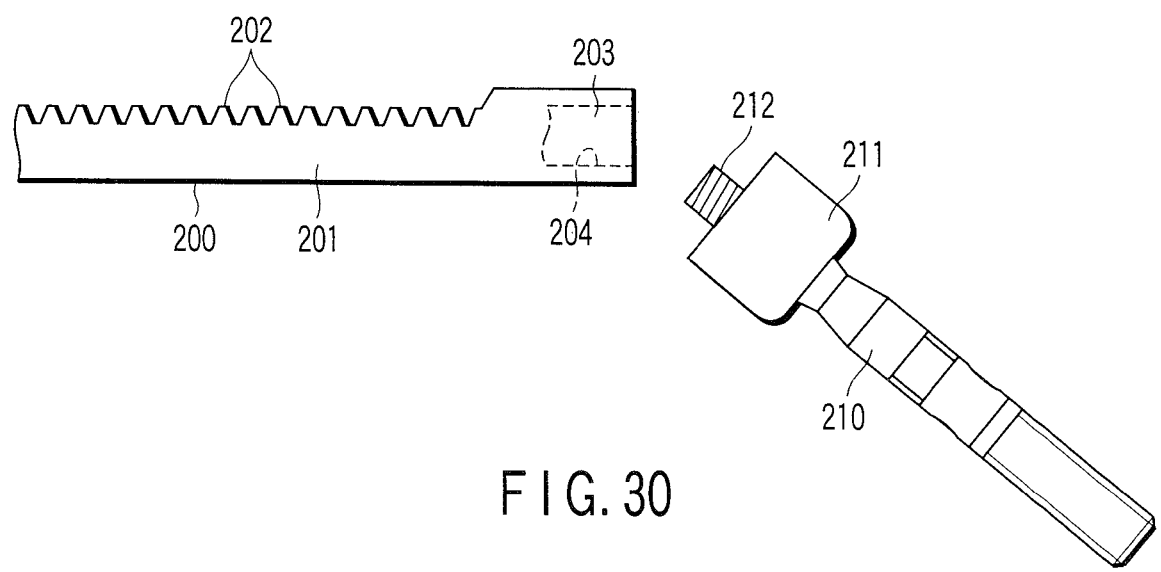
FIG. 30 is a side view showing problems of the conventional hollow rack and ball joint.

Consequently, the third processing method provides the hardness as shown in FIG. 28. That is, the hardness of the shaft portion 111 and the tooth portion 112 of the shaft side end portion 114 is Hv450 to 650 and the hardness of the opening end 113b of the tooth side end portion 113 is Hv250 to 450. Thus, the strength of the tooth side end portion 113 against external force can be intensified, processing accuracy of the threaded portion 115 can be maintained and the delayed destruction can be prevented.

According to the method for manufacturing the hollow rack of the embodiments of the present invention, as described above, the processing accuracy of the threaded portion 115 formed on the tooth side end portion 113 and the shaft side end portion 114 can be maintained and the delayed destruction can be prevented while the strength of the tooth side end portion 113 can be intensified.

In the meantime, the present invention is not restricted to the above respective embodiments. For example, material of the hollow rack 110 is not restricted to SMn433 and other material may be used. Further, because the heat treatment condition (hardening temperature/tempering temperature) is set to obtain a desired hardness and may be determined depending on material, shape and the like, it is not limited to the temperature of this embodiment. Needless to say, the present invention may be modified in various ways within a scope not departing from the spirit of the present invention.

There is provided a hollow rack end portion diameter reducing apparatus for processing a hollow bar in which a rack is formed at a portion on one end side thereof and a depression is formed between a rack tooth on each of both ends of the rack and an adjoining portion having an inclined portion opposing a tooth side face of the rack tooth and continuous to each of the both ends of the rack, so as to narrow an end portion of a portion on the cylindrical other end side of the hollow bar, the apparatus comprises a jig which includes a first jig member having a pair of convex portions which are to be fitted to the depressions in contact with the tooth side face and the inclined portion and positioning the hollow bar and a second jig member which is to be clamped/opened with respect to the first jig member, and nips the portion on the one end side between the both jig members detachably; a compression die which has an inside diameter smaller than the diameter of the outer periphery of the end portion on the other end side portion, and is to be removably pressed onto the outer periphery of the end portion on the other end side portion projected from the jig clamped together; and die driving means for reciprocating the compression die to press the compression die onto the outer periphery of the end portion on the other end side of the hollow bar up to a press-in depth determined preliminarily based on the rack and pulling out the compression die from this press-in state.

There is provided a method for manufacturing a hollow rack having a tooth portion which meshes with a pinion in a shaft portion thereof while a threaded portion for connecting to a ball joint is formed in an inner peripheral face of an end portion thereof, the method comprises a tooth forming step of forming a tooth portion in the shaft portion; an end hardening step of subjecting the end portion to high-frequency hardening; a first temperature end portion tempering step of subjecting the end portion to high-frequency tempering at a first temperature; a thread cutting step of cutting threads for forming the threaded portion in the inner periphery of the end portion after the first temperature tempering step; a tooth portion hardening step of subjecting the tooth portion to high-frequency hardening; a shaft portion hardening step of subjecting the shaft portion to high-frequency hardening; and a second temperature tempering step of subjecting the end portion, the tooth portion and the shaft portion to high-frequency tempering at a second temperature lower than the first temperature.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hollow rack in which a rack is formed at a portion on one end side while an end portion of a cylindrical other end side is narrowed by reducing a diameter thereof, wherein an adjoining portion continuous to both ends of the rack has an inclined portion opposing each of tooth side faces of rack teeth positioned on both ends of the rack and set to 25° or more with respect to a radial direction, wherein a pressure contact trace is formed in the inclined portion so as to face a depression between the inclined portion and the tooth side face, and a radius of an inner diameter of a circular face joining a flat face orthogonal to the radial direction and the inclined portion is 0.5 mm or more.

2. A method for forming a shaft portion and an end portion of a hollow rack, the method comprising:
   a tooth forming step of forming a tooth portion in the shaft portion;
   an end portion hardening step of subjecting an outer peripheral face of the end portion to high-frequency hardening;
   a first temperature tempering step of subjecting the outer periphery of the end portion to high-frequency tempering at a first temperature;
   a thread cutting step of cutting threads for forming a threaded portion in the inner periphery of the end portion after the first temperature tempering step;
   a tooth portion hardening step of subjecting the tooth portion to high-frequency hardening;
   a shaft portion hardening step of subjecting the shaft portion to high-frequency hardening; and
   a second temperature tempering step of subjecting the end portion, the tooth portion and the shaft portion to high-frequency tempering at a second temperature lower than the first temperature,
   wherein the tooth portion meshes with a pinion, and hardness of the shaft portion is set higher than hardness of the end portion.

3. A method for forming a shaft portion and an end portion of a hollow rack, the method comprising:
   a tooth forming step of forming a tooth portion in the shaft portion;
   a recess processing step of forming a concave portion by performing recess processing in the inner periphery of the end portion from an opening side;
   a thread cutting step of cutting threads for forming the threaded portion on a deep side with respect to the concave portion in the inner periphery of the end portion;

an end portion hardening step of subjecting an opening end of the end portion to high-frequency hardening;

a tooth portion hardening step of subjecting the tooth portion to high-frequency hardening;

a first temperature tempering step of subjecting the end portion to high-frequency tempering at a first temperature;

a shaft portion hardening step of subjecting the shaft portion to high-frequency hardening; and a second temperature tempering step of subjecting the end portion, the tooth portion and the shaft portion to high-frequency tempering at a second temperature lower than the first temperature, wherein the tooth portion meshes with a pinion, and hardness of the shaft portion is set higher than hardness of the end portion.

* * * * *